Jan. 23, 1968

C. HOOK 3,364,891

CONTROL SYSTEM FOR HYDROFOIL BOATS

Filed Jan. 11, 1966

INVENTOR
CHRISTOPHER HOOK
By Graybeal, Cole & Barnard
ATTORNEYS

Jan. 23, 1968     C. HOOK     3,364,891

CONTROL SYSTEM FOR HYDROFOIL BOATS

Filed Jan. 11, 1966     2 Sheets-Sheet 2

INVENTOR
CHRISTOPHER HOOK
By Graybeal, Cole & Barnard
ATTORNEYS

United States Patent Office 3,364,891
Patented Jan. 23, 1968

3,364,891
CONTROL SYSTEM FOR HYDROFOIL BOATS
Christopher Hook, Thistlefield, Harbour Way,
Old Bosham, England
Filed Jan. 11, 1966, Ser. No. 519,866
Claims priority, application Great Britain, Jan. 14, 1965,
1,593/65
12 Claims. (Cl. 114—66.5)

ABSTRACT OF THE DISCLOSURE

A flight control system comprising a single forward mechanical sensor and control means response to its movement to apply pitch compensation to both of two laterally spaced, variable-incidence hydrofoils. A pair of laterally spaced mechanical sensors and means response to differential movement of said latter sensors to apply roll compensation to the hydrofoils.

---

Figures 1, 1A:
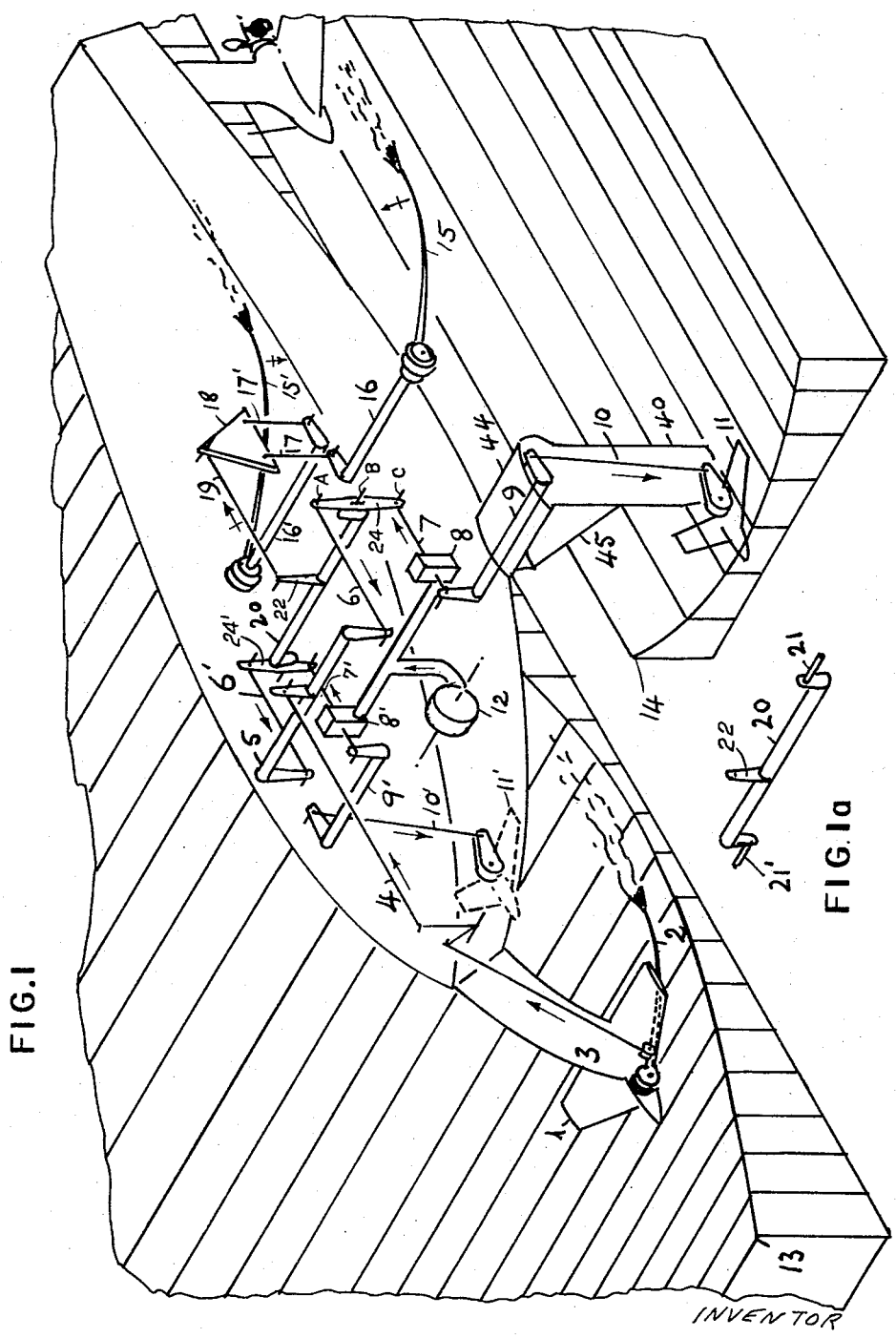

This invention relates to hydrofoil boats, and more particularly to a control system for continuous flight correction on such boats.

Hydrofoil boats that fly on fully submerged hydrofoils require to be fitted with control systems able to detect changes of water level, and correct the angle of incidence of the hydrofoils in consequence, so that flight is maintained at a given distance above the surface. Forward pointing feelers have an advantage in that they provide a predictor effect in respect of head seas, where this is needed the most because the rate of encounter is highest. The rate of response of a hydrofoil to incidence change being high compared to rates of wave arrival say from the side or stern, predictor effect is not wanted for these cases.

Hitherto it has been customary to mount two feelers at the bow and towards each beam. Lateral stability is controlled by the differential of the applied hydrofoil incidence on each beam and it follows that in order to detect a significant difference of water level the two points of contact must be fairly widely separated spanwise and this tends to lead to a cumbersome design. Public taste in marine craft always tends towards designs that are narrow in beam and with few added parts to give trouble on coming alongside.

This invention is restricted to those control systems in which mechanical contact is made with the water surface, with or without hydraulic, electric, pneumatic or other boosting between the mechanical sensor and the hydrofoil incidence control rod.

An object of this invention is to simplify the design of such controls and make them more practical and acceptable to shipbuilders and users.

The invention accordingly consists in a flight control system for hydrofoil boats adapted to fly on laterally spaced adjustable incidence hydrofoils comprising a single mechanical sensor mounted to ride on the water surface ahead of the hydrofoil boat, means, responsive to movement of the said single mechanical sensor, to apply pitch control or compensation to the hydrofoils, a pair of mechanical sensors mounted to ride on the water surface at spaced points on a line extending athwartships of the hydrofoil boat, and means, responsive to differential movement of the pair of sensors, to apply roll compensation to the hydrofoils.

The pitch and roll controls are thus separated.

Any predictor effect that may be wanted in respect to roll control can be obtained by placing sensors at, or even in the rear of, the side supporting struts for the hydrofoils. Whereas a predictor related in any way to pitch control is worse than useless unless well in front of the hydrofoil it controls because the signal it provides will be badly out of phase. As soon as it is severed from all connection with pitch control this reservation falls down and rearwardly trailing predictors even aft of the associated hydrofoil are quite acceptable since waves coming from the side or the rear are of a much lower frequency of encounter. The separation of the two modes (pitch and roll) makes it much easier to include the necessary amplification of the roll differential which is needed because designs have tended to become unnaturally narrow in beam or span and because the damping requirements of the two signals are not the same. Whereas the amplitude of the pitch signal requires to be greatly reduced by damping and/or selection of mechanical ratios before a signal taken from a wave can be used to control the incidence of a foil, the roll signal requires on the contrary to be amplified so that a roll error taken by contact even across a small span will give a reasonably large signal differential.

In a preferred embodiment, one mechanical sensor is mounted well forward of the bow and the resulting water level or wave signal is fed equally to both side hydrofoils, so that, with this arrangement alone, the craft would respond only to disturbances in pitch and would be laterally unstable. Ratio selection devices may be used to modify amplitudes, damping to modify rates, as well as any form of boost and any form of pilot or gyroscopic intervention without modification of the present description.

Two mechanical surface sensors are mounted, one on each beam either in front of, or behind the main supporting struts or at any other convenient location removed from the centreline of the craft. This roll signal may also be modified by any of the above mentioned means. The differential of this signal is picked off and fed into the linkage between the forward or pitch sensor and the hydrofoil command rods. A simple method of doing this is to use a three point floating lever. Such a lever has three points, one near each end and one intermediate its ends. From a first end point the foil incidence command rod is controlled; from the second end point the signal comes for pitch control while the intermediate point acts as a fulcrum. But for roll control the intermediate point is moved and the second end point acts as the fulcrum. The intermediate point of each floating lever may be defined by a slot into which a stud or pin is engaged, which is eccentric on an athwartships rod. The stud on one side is forward of the rod and the stud on the other side is aft of the rod. As a result, turning of the rod produces a foil increment of incidence on one side and a foil decrement of incidence on the other, and a roll will be produced.

To detect the differential of the roll signal it will suffice to bring the movement from each side sensor into two parallel rods so that they move in the same direction for rising or falling water level. A link is placed across carrying a right angled branch in the centre, the said branch lying parallel with the rods. A link parallel with the first link taken off a certain distance will then give a differential signal at right angles to the rods and this can actuate, say a spool, connected into a pneumatic, hydraulic or electric circuit to connect eventually to the intermediate point.

To include other interventions such as pilot, gyroscope or inertia controls to limit vertical accelerations in waves, particularly head seas, the three point levers may be repeated in series, each new lever allowing a fresh intervention. The command rod point of the first lever would connect to the pitch signal point of the second lever, making available the intermediate point of the second lever for the new intervention. However, for two or more interventions the series arrangement would preferably be done in a sub-assembly so as to cut the main lines only once.

Alternatively, the mechanical signals for the sensors may be converted, as in variable potentiometers, to electrical signals which may be processed and amplified as is required to operate electric motors or other servos to adjust the incidence of the hydrofoils.

Figure 2:
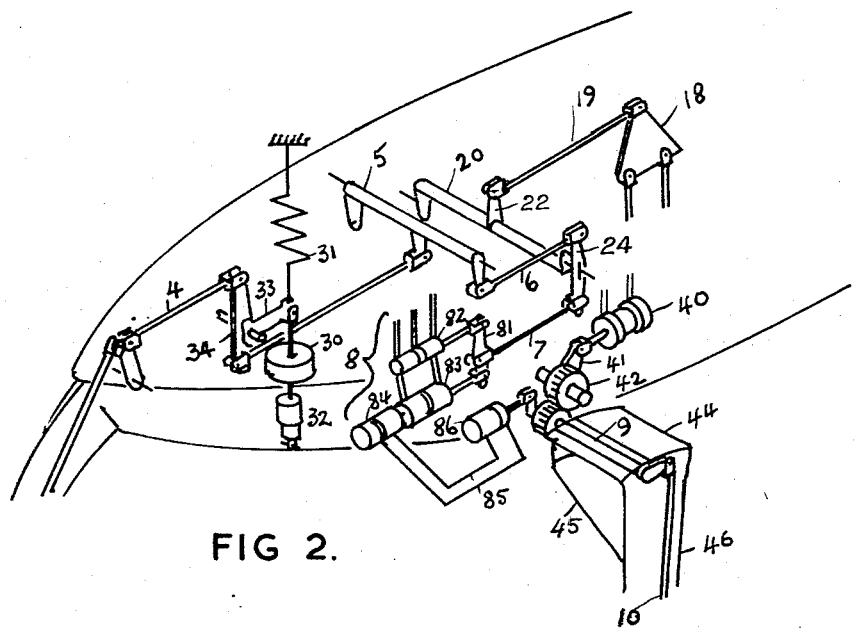
Figure 3:
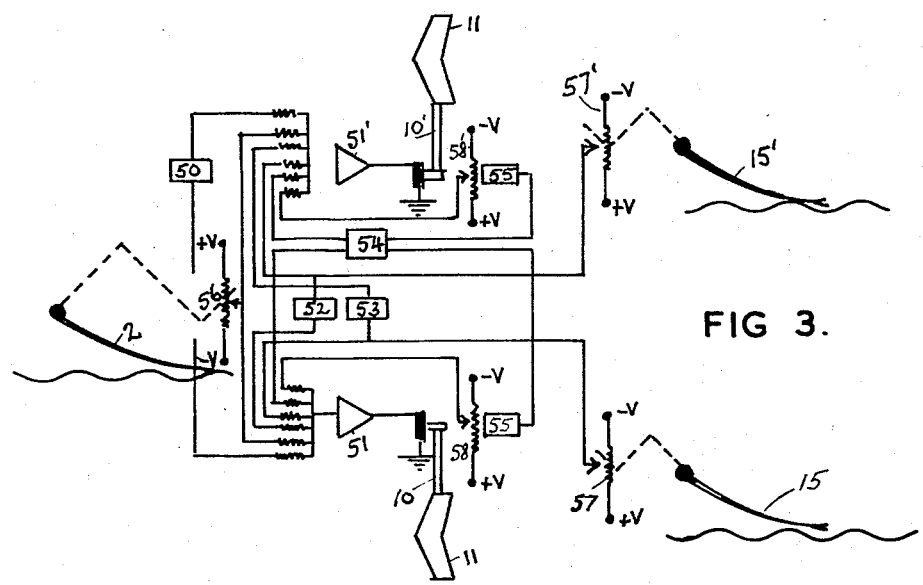

The invention will be further described with reference to the accompanying drawings, wherein:

FIGURE 1 illustrates in diagrammatic form a preferred embodiment of the invention, FIGURE 1a illustrates a subassembly portion of the mechanism of FIGURE 1, FIGURE 2 is a view similar to FIGURE 1, with parts omitted, showing additional features, and, FIGURE 3 is a circuit diagram of an alternative embodiment of the invention.

The hydrofoil boat illustrated in FIGURE 1 has a forward crash plane 1 to which is pivoted a single sensor in the form of a light feeler 2 adapted to ride on the water surface. Movement of the feeler 2 relative to the crash plane 1, and therefore the hull of the boat, is transmitted through a linkage consisting of rods 3 and 4, a cranked shaft 5, rods 6 and 6', rods 7 and 7' to servo mechanisms 8 and 8' which translate and amplify the motion of rods 7 and 7' into movement of shafts 9 and 9', rods 10 and 10' and consequent adjustment of the angle of incidence of hydrofoils 11 to the water in which they are submerged. Hydraulic or pneumatic pressure for the movement of the shafts 9 and 9' is applied by a pump 12.

The sensor 2 is thus sensitive to waves such as 13 to provide for unified action of the hydrofoils 11 and 11' to raise and lower the boat to maintain the water clearance.

A pair of sensors 15 and 15' are spaced athwartships so as to detect incipient rolling, caused by waves such as 14, by the difference in movement of the two spaced sensors. The sensors 15 and 15' rotate shafts 16 and 16' having cranks attached to rods 17 and 17'. A triangular plate 18 has the rods 17 and 17' pivoted at two corners thereof and a rod 19 is pivoted to the third corner. The rod 19 is pivoted to a lever 22 that is rigid with an athwartship rod 20 having oppositely cranked ends pivotally mounted by pins 21, 21' (FIGURE 1a) at intermediate locations on the three point floating levers 24, 24' connecting the rods 6 and 7 and 6' and 7' respectively.

The roll sensors 15 and 15' will not register any signal for a wave of type 13, i.e. a head or following wave. The triangle 18 will merely rise and fall without any movement of the rod 19. Should the craft roll to port however then sensor 15 will rise and sensor 15' will fall as marked with crossed rearward arrows producing a rearward motion on rod 19 and a clockwise rotation of shaft 20.

Floating levers 24, 24' are similar, so they both will be described in reference to lever 24. Lever 24 has three points of connection. From end connection C the foil incidence command rod is controlled; from the second end point A the signal comes from pitch control while the intermediate point B acts as a fulcrum. But for roll control point B is moved and point A acts as the fulcrum. Point B may be defined by a slot in the lever 24 into which a stud or pin 21 is engaged, which pin 21 is eccentric on the athwartship rod 20. Since the pin ends 21, 21' of shaft 20 pass through the levers 24, 24' connecting 6 to 7 and 6' to 7', and since the pin 21 of shaft 20 is higher than the center line of shaft 20 while the pin 21 is lower, it follows that a signal, from rod 19 to lever 22, in the direction of the arrow (FIGURE 1) will result in an incidence increasing movement of rods 7 and 10 and an opposite or incidence decreasing movement of rods 7' and 10'. Such a signal may result from the arrival of a beam sea such as 14 causing the boat to roll with the waves as a normal boat would do.

The advantage of dealing with pitch signals as distinct from roll signals is that whereas the former are encountered at widely different rates, depending on whether they are ahead or following, thus calling for widely different link factor and damping treatments, roll signals are encountered at much more constant rates since they are a function of wave speeds only.

Whereas head seas tend to produce double heave, one from extra lift induced by orbital motions and the other from the detected wave shape fed in by sensor 2, this does not apply to following seas where the orbital motion is reversed so that the detected shape signal requires to be somewhat augmented if the craft is not to come off its foils and sit down.

This calls for variable link factors and dampings but if these are applied to the roll signals the corrections will be too slow and/or too small and the craft will sway sideways. This alarms the passengers.

The double heave can introduce sudden heave effects that can be destructive if the link factor is not right or the damping too weak. Therefore other interventions similar to the roll intervention explained, must be introduced, notably an inertial pitch signal reduction, a pilot's intervention and in certain cases, a roll reduction intervention based on gyroscopic control.

FIGURE 2 shows part of a structure similar to that in FIGURE 1 but including an inertial damping device and illustrating more fully the servo mechanism 8. Rod 4 is connected to shaft 5 via a three point floating lever 34. A mass 30 is suspended between a spring 31 and a damper 32 so that on excessively rapid movement in pitch the mass 30 lags somewhat and moves the fulcrum of the lever 34 by means of a link 33 so as to slow the excessively rapid pitching by affecting the signals applied to the rods 10 and 10'.

A pilot intervention can be similarly arranged but has not been shown for clarity of illustration. Also a gyroscopic stabilizer arrangement may be included so as to intervene similarly in the roll control.

FIGURE 2 also shows a typical servo mechanism between the rod 7 and the shaft 9. It comprises a three point floating lever 81 with the rod 7 connected at an intermediate point and a spool valve 82 actuated by one end. The spool valve controls a hydraulic piston cylinder unit 83 which feeds back to the opposite end of the lever 8. The unit 83 also controls a master hydraulic unit 84 connected via pipes 85 to a slave unit 86 which drives a crank on the shaft 9.

The inertia or other intervention could act directly on the spool valve or by addition or subtraction from the liquid in the unit 83.

In order to achieve retraction of the support strut and foil, a piston cylinder unit 40 moves a torque arm 41 attached to a gear 42 or segment which engages a smaller gear 43 rigid with a main tube spar to which the supporting element 44 of the support strut 46 is attached. An anhedral hydrofoil 45 is included in the strut assembly to assist in holding the strut 46 in its correct position.

This foil 45 if given a positive angle of attack to the water, provides a powerful stabilising moment to the hull since the line of action of the lift is outwards and upwards or substantially at right angles to a line joining the hydrofoil and the C.G. The length of such an anhedral strut can be increased and its effective lift improved if the main branch of the strut is spread outwards so that the hydrofoil at the end thereof is given dihedral with respect to the craft. Such a change increases the total span but in no way affects the ability to retract the whole.

FIGURE 3 shows an electrical transmission between the sensors 2, 15 and 15' and the hydrofoils 11 and 11'. The foil control rods 10 and 10' are driven by electric motors energised by voltage amplifiers 51 and 51' having multiple inputs. One input is from a pilot intervention unit 50. A second input is from a variable potentiometers 56 controlled by the sensor 2. A differential input from the sensors 15 and 15' is obtained by passing signals from potentiometers 57, 57' directly to one of the amplifiers and through inverters 52 and 53 to the other. Each amplifier also receives a feedback input from the motor controlled by means of potentiometers 58 and 58'. The damping of excessively rapid movements is achieved by tacho generators 55, 55' driven by the electric motors. The output of these tacho generators are fed to a damping control 54 and thence to inputs to the respective amplifiers.

Thus, electrical signals could be used to control hydraulic or pneumatic servos such as those described with reference to FIGURE 2. For instance, each sensor could be mounted on a shaft with a tachogenerator of small size and low intertia, for speed of response, feeding into a circuit similar to that shown in FIGURE 3. The outputs from the amplifiers could operate spool valves for servos rather than electric motors. Such an arrangement would eliminate rods and levers and would be cheap and light. Various modifications may be made within the scope of the invention.

I claim:

1. In a hydrofoil boat comprising a pair of laterally spaced, variable-incidence hydrofoils, a flight control system comprising a single mechanical sensor mounted to ride on the water surface ahead of the hydrofoil boat, means, responsive to movement of the said single mechanical sensor, to apply pitch control or compensation to both of said hydrofoils, a pair of mechanical sensors mounted to ride on the water surface at spaced points on a line extended athwartships of the hydrofoil boat, and means, responsive to differential movement of the pair of sensors, to apply roll compensation to said hydrofoils.

2. The structure defined by claim 1, in which the sensors are in the form of light feelers adapted to ride on the water surface, and comprising mechanical linkage interconnecting the feeler and the pitch and roll compensation applying means.

3. The structure defined by claim 2, in which the linkage includes a pair of three point floating levers between the sensors and hydrofoils, one point of each lever being connected to a corresponding incidence control for a hydrofoil, a second point being connected to apply signals from the single sensor, and the third point being connected to apply differential signals from the pair of sensors, the said third point being adapted to respond in opposite directions to the same differential signal so as to apply equal and opposite roll compensation to the hydrofoils.

4. The structure defined by claim 3, comprising servos between the said first point of the three point floating levers and the respective hydrofoils.

5. The structure defined by claim 2, comprising inertial damping means in the linkage between the said single sensor and the pitch compensation applying means to limit the speed of response of the hydrofoils to the single sensor.

6. The structure defined by claim 3, comprising a further three point floating lever in the linkage below the said one sensor and the three point floating levers, inertial damping means being connected to an intermediate portion of the said further floating lever.

7. The structure defined by claim 1, comprising a plate connected to the pair of sensors to tilt in response to differential movement thereof, and link means for feeding a mechanical signal from the plate to the roll compensation or connection applying means.

8. The structure defined by claim 1, in which the sensors are in the form of light feelers adapted to ride on the water surface, and comprising electric motors to control the hydrofoil mechanism and electrical means for connecting the sensors to the motor.

9. The structure defined by claim 8, comprising a variable potentiometer associated with each sensor and controllable thereby to produce an electrical voltage signal depending on the position of the sensor.

10. The structure defined by claim 9, comprising an individual voltage amplifier associated with each electric motor, each amplifier having an output connected to the respective motor, and input, the voltage signal from the single sensor being fed to the input of each amplifier, the voltage signals from the pair of sensors being each fed directly to the input of one amplifier and via inverters to the other to provide resultant differential equal and opposite signals from the pair of sensors, and means for feeding feedback signal to the input of each amplifier dependent on the angle of incidence of the associated hydrofoil.

11. The structure defined by claim 10, further comprising tacho-generators driven by the electric motors and means for feeding a damping signal from the tacho-generators to the inputs of the associate amplifiers.

12. The structure defined by claim 1, in which the sensors are in the form of light feelers adapted to ride on the water surface, comprising individual shaft means adapted to be rotated by each feeler, tacho-generator means on each shaft means and adapted to produce an electrical signal dependent on the position of the associated feeler, and servo means for varying the incidence of the hydrofoils, said servo means being controlled by the signals from the tacho-generator means.

References Cited

UNITED STATES PATENTS

| 955,343 | 4/1910 | Meacham | 114—66.5 |
| 1,186,816 | 6/1916 | Meacham | 114—66.5 |

ANDREW H. FARRELL, *Primary Examiner.*